No. 878,483. PATENTED FEB. 4, 1908.
C. W. MILES.
ICE MACHINE COMPRESSOR.
APPLICATION FILED MAR. 9, 1906.
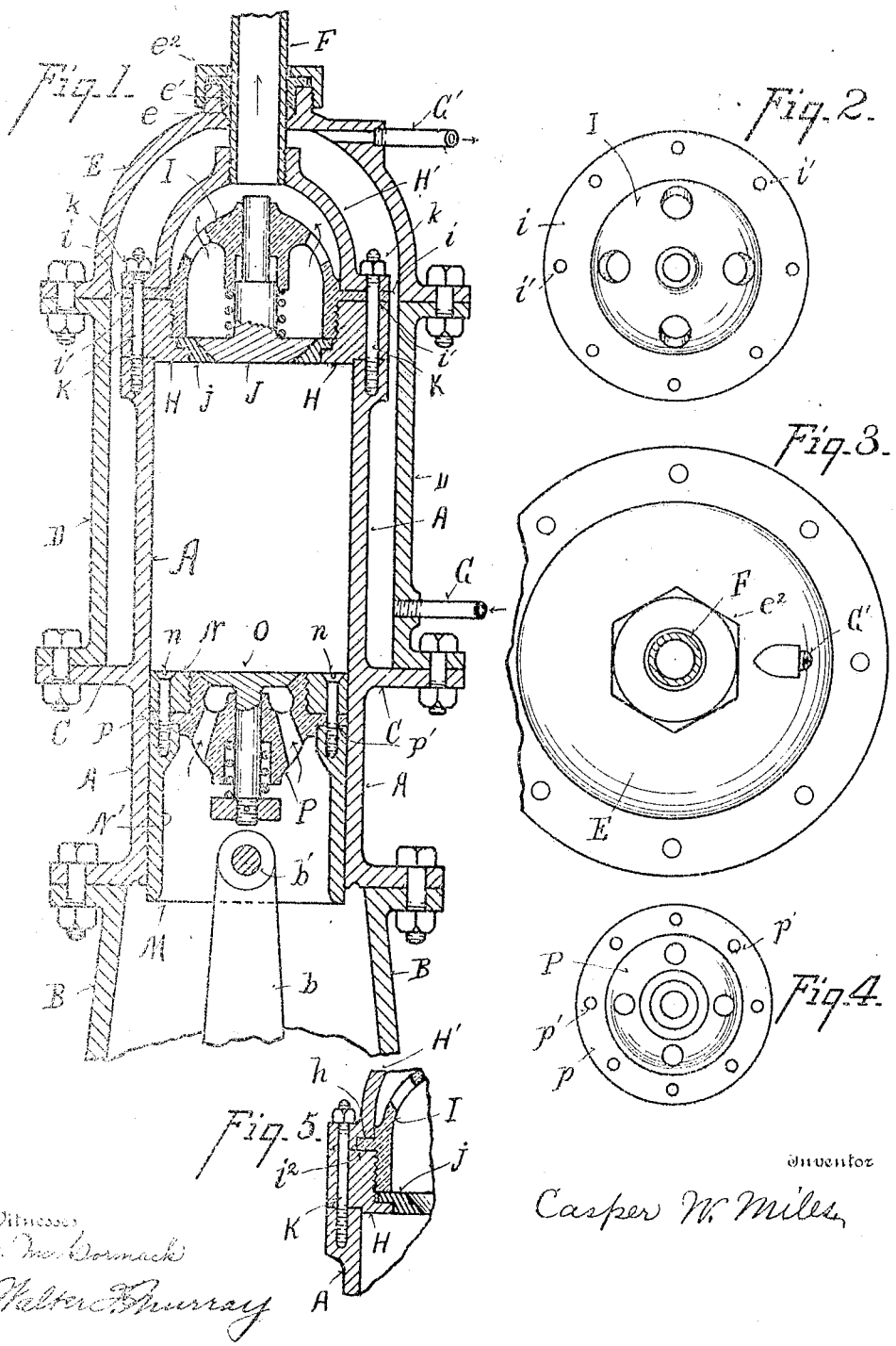
Inventor
Casper W. Miles

UNITED STATES PATENT OFFICE.

CASPER W. MILES, OF CINCINNATI, OHIO.

ICE-MACHINE COMPRESSOR.

No. 878,483.     Specification of Letters Patent.     Patented Feb. 4, 1908.

Original application filed May 1, 1905, Serial No. 258,198. Divided and this application filed March 9, 1906. Serial No. 305,020.

*To all whom it may concern:*

Be it known that I, CASPER W. MILES, a citizen of the United States, residing at Cincinnati, in the county of Hamilton and State of Ohio, have invented certain new and useful Improvements in Ice-Machine Compressors, of which the following is a specification.

My invention relates to improvements in ice machine compressors.

One of its objects is to provide an ice machine compressor with improved cooling mechanism, which may be readily removed from the compressor to give access thereto, or replaced by new parts if damaged by freezing of water therein or otherwise.

Another object is to provide improved means for securing the valve cages in place in the plunger and cylinder head so that they are not liable to become loosened by the vibration of the mechanism.

It further consists in certain details of form, combination and arrangement, all of which will be more fully set forth in the description of the accompanying drawings, in which;

Figure 1 is a central vertical section through a compressor cylinder embodying my improvements. Fig. 2 is a top plan view of the valve cage located in the cylinder head. Fig. 3 is a top plan view of the dome or cap of the cooling jacket. Fig. 4 is a bottom plan view of the valve cage located in the plunger. Fig. 5 is a detail sectional view showing a modification of Fig. 1.

In the accompanying drawings A represents the cylinder of an ice machine compressor. The base B on which the cylinder is mounted preferably serves as a housing for the pitman $b$ and crank of the driving shaft, and also as an inlet passage for the gas on its way to the cylinder.

C represents an annular flange projecting from the cylinder at a point midway between the two ends of the cylinder. Secured to this flange is a cylindrical section D of the water jacket, and to the upper end of section D is secured the cap or dome shaped section E of the water jacket, a stuffing box $e$, gland $e'$ and screw cap $e^2$ being provided at the top of section E to form a tight joint about the gas outlet pipe F where it passes through section E. Water is admitted to the jacket so as to submerge the upper portion of the cylinder by means of pipe G, and the heated water from the jacket is permitted to overflow or escape through pipe G'.

The lower end of the cylinder is kept cool by the circulation of the cool gas passing into the cylinder, while the upper end of the cylinder is highly heated due to the compression of the gas therein, and the flange C is located at approximately the neutral point between the hot and cold ends of the cylinder, so that the lower end of the cylinder may remain cool, and the water of the jacket may take up and carry the heat from the upper end of the cylinder, and attain the maximum efficiency in so doing, by reason of the tendency of the water to rise on becoming heated. It will be noted that the jacket sections can be readily detached and replaced by new parts should occasion require it.

The upper end of the cylinder is closed by a head composed of a disk or ring shaped section H and a dome or cap shaped section H'.

I represents the valve cage in which is located the exit valve J. The cage I is threaded into the section H, and in order to insure that the same shall not become loose due to the constant vibration of the cylinder in use, I preferably provide a flange $i$ which seats on the upper face of section H, and is locked thereto to prevent the unscrewing of the cage by means of the stud bolts K, which pass through perforations $i'$ in section H and flange $i$, and also through perforations in the flange of the cap section H', the parts H $i$ and H' being clamped to the cylinder from which the stud bolts K project by means of nuts $k$. Thus an possibility of the cage becoming unscrewed from the section H is avoided, and the valve J and its seat $j$ are firmly locked in position.

The plunger M, is reciprocated backward and forward in the cylinder by means of a pitman rod or link $b$ pivoted thereto by a rod or pin $b'$. This plunger is composed of a disk or ring section N and a shell or cylindrical section N', which are secured together by means of screws $n$.

O represents the inlet valve which is mounted in a cage P which is threaded into the plunger section N.

$p$ represents an annular flange projecting from the cage P and perforated at $p'$ for the passage of the shanks of the screws $n$, by means of which the flange $p$ is firmly clamped between sections N N' and all possibility of the cage becoming unscrewed from section N is obviated.

In the modification Fig. 5 I have shown the flange $i^2$ narrower than the flange $i$ of Fig. 1 and seated in a recess $h$ formed at the joint between sections H H' whereby the cage is prevented from becoming unscrewed from the section H. The same arrangement of parts as shown in Fig. 5 may also be employed to prevent the unscrewing of the cage in the plunger.

The gas outlet pipe F is preferably threaded into the section H' of the cylinder head, but may if desired be otherwise attached thereto by a tight joint.

The mechanism herein shown and described is capable of considerable modification without departing from the principle of my invention.

Having described my invention, what I claim is:

1. In an ice machine compressor, a plunger comprising a ring section and a cylindrical section, a valve cage threaded into the ring section and provided with an annular flange clamped in the joint between the ring section and cylindrical section, and means for clamping said ring section and cylindrical section together.

2. In an ice machine compressor, a cylinder, a cylinder head comprising a ring section and a cap section, a valve cage threaded into said ring section and provided with an annular flange clamped in the joint between the ring section and cap section, and means for clamping the ring section and cap section together and to the end of the cylinder.

In testimony whereof I have affixed my signature in presence of two witnesses.

CASPER W. MILES.

Witnesses:
WALTER F. MURRAY,
AGNES McCORMACK.